United States Patent [19]

Cadolle

[11] 4,346,013
[45] Aug. 24, 1982

[54] THIXOTROPIC LIQUID AND PROCESS FOR ITS PRODUCTION

[75] Inventor: Daniel Cadolle, Gland, Switzerland

[73] Assignee: BP Chemicals Limited, London, England

[21] Appl. No.: 179,769

[22] Filed: Aug. 20, 1980

[30] Foreign Application Priority Data

Aug. 21, 1979 [GB]  United Kingdom ............... 7929130
Nov. 24, 1979 [GB]  United Kingdom ............... 7940673

[51] Int. Cl.$^3$ ............................................. C09K 7/02
[52] U.S. Cl. ............................ 252/8.5 A; 252/8.55 R
[58] Field of Search ............. 252/8.5 A, 8.5 B, 8.5 C, 252/8.55 R

[56] References Cited

U.S. PATENT DOCUMENTS

| | | | |
|---|---|---|---|
| 2,570,947 | 10/1951 | Himel et al. | 252/8.5 |
| 3,668,122 | 6/1972 | Branscum | 252/8.5 |
| 3,727,687 | 4/1973 | Clampitt et al. | 166/274 |
| 3,804,174 | 4/1974 | Chatterji et al. | 166/293 |
| 3,852,201 | 12/1974 | Jackson | 252/8.5 |
| 3,954,628 | 5/1976 | Sauber et al. | 252/8.5 |
| 3,988,246 | 10/1976 | Hartfiel | 252/8.5 |
| 4,035,195 | 7/1977 | Podlas | 106/194 |
| 4,255,268 | 3/1981 | Block | 252/8.5 |

OTHER PUBLICATIONS

Rogers, Composition and Properties of Oil Well Drilling Fluids, Revised Ed., Pub. 1953, p. 251.

*Primary Examiner*—Herbert B. Guynn
*Attorney, Agent, or Firm*—Brooks, Haidt, Haffner & Delahunty

[57] ABSTRACT

A non-hydraulic thixotropic aqueous liquid comprises a cellulose ether and an effective amount of ferric hydroxide. A thixotropic aqueous liquid may be made by mixing an aqueous cellulose ether solution and a water soluble alkali in the absence of a hydraulic substance.

The liquids can be used as drilling muds.

10 Claims, No Drawings

THIXOTROPIC LIQUID AND PROCESS FOR ITS PRODUCTION

The present invention relates to thixotropic solutions of cellulose ethers.

Aqueous solutions of cellulose ethers e.g. hydroxy ethyl cellulose, are used for many purposes and are for example used as bore hole fluids in the oil industry. Therefore they may be used in fracturing fluids and in drill muds. For these purposes aqueous solutions of cellulose ethers are used which have pseudo plastic viscosity properties i.e. their viscosity decreases as the shear applied to them is increased. It would be desirable to impart thixotropic properties to aqueous solutions of cellulose ethers. (Liquids display thixotropy when their viscosity falls when subject to a constant shear and thixotropy is thus a time dependent phenomenon). A thixotropic aqueous solution of a cellulose ether would be better able to support the particles of rock etc produced in the bore hole drilling process so preventing them from settling onto the drill bit.

It is known to use cellulose ether solutions in drilling fluid. U.S. Pat. No. 3,954,628 discloses drilling fluid based on carboxyl methyl cellulose.

U.S. Pat. No. 3,727,687 discloses that it may be useful to gel aqueous solutions of cellulose ethers used as drilling fluids and for this purpose uses a water-soluble compound of a polyvalent metal and a water-soluble reducing agent. The polyvalent metal compounds specifically disclosed are chromium and manganese compounds and the reducing compounds mentioned include sulphur compounds such as hydrosulfite and ferrous chloride. The use of manganese and chromium compounds is undesirable for toxicity reasons. They are expensive and the need to provide an additional reducing agent will increase the expense still further.

U.S. Pat. No. 3,804,174 discloses a cementing composition for use in oil and gas wells. The composition contains a cellulose ether, cement, and a polyvalent metal salt which may be a salt of zirconium, lead, chromium, ferric ion, hafnium and lanthanium. The use of ferric chloride is mentioned but it is preferred to use zirconium oxychloride. Compositions containing cement can be used in various special situations in drilling oil and and gas wells. They cannot be used as standard drilling fluids or 'muds' because they will in due course set and become solid.

It is desirable to be able to prepare aqueous solutions of cellulose ethers which do not contain cement, and which can therefore be used in the preparation of drilling muds, but which have thixotropic properties. It is also desirable to be able to avoid the use of toxic and/or expensive materials.

Ferric chloride when added alone to hydroxy ethyl cellulose does not impart satisfactory thixotropic properties.

According to the present invention a non-hydraulic thixotropic aqueous liquid comprises a cellulose ether and an effective amount of ferric hydroxide.

It is particularly preferred that the ferric hydroxide is formed in situ in the aqueous solution of the cellulose ether.

According to a further aspect of the present invention a process for producing a non-hydraulic thixotropic aqueous liquid comprises mixing together an aqueous solution of hydrated cellulose ether and a water soluble ferric salt with a water soluble alkali to give an alkaline solution in the absence of an effective amount of a hydraulic substance.

The present invention is concerned with non-hydraulic thixotropic aqueous liquid i.e. liquids which do not form a crystalline lattice structure exhibiting a degree of mechanical stability and/or physical strength by reaction of water at ambient temperature with a hydraulic substance. Examples of hydraulic substances are gypsum, calcium sulphate hemihydrate (plaster of paris), pulverised fuel ash, and hydraulic cements e.g. Portland cement. If the composition of the present invention is to be non-hydraulic any hydraulic substances present must not be present in an effective amount i.e. in an amount sufficient to give hydraulic properties.

The thixotropic solution is prepared using a cellulose ether in hydrated form. When a cellulose ether is mixed with water there is initially no increase in viscosity. After a certain time known as the "hydration time", the viscosity starts to increase as the cellulose ether becomes hydrated. The cellulose ether is used in the present invention after this hydration step has taken place.

Examples of cellulose ethers which may be used in the present invention are carboxy ethyl cellulose and, preferably, hydroxy ethyl cellulose. The viscosity of a solution of cellulose ether depends on the molecular weight of the cellulose ether and on the quantity of cellulose ether present in the solution. It is preferred to use a quantity of any given cellulose ether which is sufficient to give an apparent Fann viscosity (600/2) of at least 20 cps in pure aqueous solution i.e. in the absence of salts such as ferric chloride. The Fann viscosity is determined using the Fann viscometer and is a well known test in the oil industry.

The molecular weight of cellulose ethers is usually indicated by the viscosity of a standard solution under standard conditions rather than by giving molecular weight values. Particularly in the oil industry it is desirable to have solutions with low solids content and it is therefore preferred to use a cellulose ether which has a viscosity of at least 70,000 cps at 25° C. at the shear rate of 1 sec$^{-1}$ at 2% by weight concentration in pure water. An example of such a material is the grade of Cellosize (registered trade mark) hydroxy ethyl cellulose known as 100 M.

The preferred cellulose ether is hydroxy ethyl cellulose and the preferred hydroxy ethyl cellulose are those in which the degree of substitution i.e. the average number of hydroxyl groups in the cellulose which carry groups derived from ethylene oxide, is preferably in the range 0.8 to 1.2. The molar substitution i.e. the average number of ethylene oxide molecules that have reacted with each anhydro glucose unit in the cellulose is preferably in the range 1.7 to 2.3.

The ferric salt may be for example ferric alum but is preferably ferric chloride. The alkali may for example be ammonium hydroxide, sodium hydroxide or potassium hydroxide; it is preferably sodium hydroxide.

Once the man skilled in the art has been taught how to make thixotropic aqueous solutions of cellulose ethers in accordance with the present invention, the quantities of materials required to give optimum results can be readily determined by simple tests. The quantity of cellulose ether necessary to give good thixotropic properties may depend on the quantity of water soluble ions present in the aqueous solution. Thus greater quantities of cellulose ether may be required in the presence of water soluble salts. However it is a feature of the invention that thixotropic solutions can be obrained in the presence of concentrations of dissolved salts which would have very adverse effect on thixotropic solutions obtained by known techniques.

The quantity of ferric salt is preferably equivalent to at least 0.05% weight of ferric chloride based on weight of total solution and is preferably not more than 0.4% or preferably not more than 0.3% by weight of the total solution. The quantity of alkali present is preferably equivalent to at least 0.5% by weight of sodium hydroxide based on total solution. It is preferably not more than that equivalent to 2% by weight of sodium hydroxide based on the total solution preferably not more 1.5% by weight.

The invention will now be illustrated by reference to the following Examples. In these Examples references are made to Fann viscosity and to gel strength. Fann viscosity is a standard test used in the oil industry and is carried out using a Fann viscometer sold by the Baroid Division of NL Industries Inc. A description of the Fann viscosity determination and gel strength measurements is given in Section 900 of the Baroid Drilling Mud Data Book.

All the experiments were carried out using a hydroxy ethyl cellulose solution prepared from Cellosize (trade mark) QP-100 MH which is hydroxy ethyl cellulose having a viscosity of around 100,00 cps at 25° C. in a 5% solution at a shear rate 1 sec$^{-1}$ with a degree of substitution of approximately 1 and a molar substitution of approximately 2. The hydroxy ethyl cellulose solutions are all prepared in hydrated form. Solutions of ferric chloride hexahydrate and sodium hydroxide were added to the hydroxy ethyl cellulose solutions to give the concentrations based on total solution given in the Tables. The ferric chloride solution had in the composition $FECL_3 6H_2O$ 100 grams water 200 grams $M_2SO_4$ (concentrated) 1 drop The sodium hydroxide solution used contained 20% sodium hydroxide by weight.

Some of the solutions were prepared using fresh water the results are given in Tables 1 and 2. Other solutions were prepared using sea water or sea water plus 5% by weight KCL. The results are given in Table 3.

TABLE 1

PROPERTIES OF QP-100MH/FERRIC CHLORIDE FRESH WATER SOLUTIONS

| QP-100MH Concentration lbs/bbl | FeCl$_3$.6H$_2$O 50% Concen. % (on total solution) | NaOH % (on total solution) | Fann Viscosity (cps) 600/2 | 600/2 (After shearing) | Gel Strength (lbs/100 ft$^2$) 10' | 10" | 10'–10" | Gel Strength (lbs/100 ft$^2$) after shearing 5 mins. at 100,000 sec$^{-1}$ 10' | 10" | 10'–10" |
|---|---|---|---|---|---|---|---|---|---|---|
| 1.5 | 0.4 | 0.56 | 72 | 37 | 32 | 19 | 13 | 19 | 9 | 10 |
| 1.5 | 0.8 | 0.56 | 80 | 44 | 31 | 19 | 12 | 20 | 10 | 10 |
| 1.5* | 1.2 | 0.56 | 62 | 38 | 18 | 10 | 8 | 18 | 8 | 10 |
| 2.0 | 0.4 | 0.56 | 135 | 65 | 70 | 42 | 28 | 38 | 20 | 18 |
| 2.0 | 0.8 | 0.56 | >150 | 82 | 86 | 46 | 40 | 41 | 25 | 16 |
| 2.0 | 1.2 | 0.56 | 115 | 75 | 30 | 19 | 11 | 30 | 19 | 11 |
| | | | | 40 | | | | 17 | 9 | 8 |
| | | | | 38 | | | | 14 | 8 | 6 |

*After 1 week
*After 1 month
' = minutes
" = seconds

TABLE 2

PROPERTIES OF QP-100MH/FERRIC CHLORIDE FRESH WATER SOLUTIONS

| Compound | QP-100MH Concentration lbs/bbl | FeCl$_3$.6H$_2$O 50% Concent. % (on total solution) | NaOH 50% (on total solution) | T °C. | pH | Fann Viscosity (cps) 300 | 600 | AV | Gel Strength (lbs/100 ft$^2$) 10' | 10" | 10'–10" | API Water Loss (ml/30 mins.) |
|---|---|---|---|---|---|---|---|---|---|---|---|---|
| 1 | 1.5 | 0.8 | 0.56 | 22 | 12.8 | 138 | 195 | 97 | 30 | 16 | 14 | 15 |
| 1 | 1.5 (A) | 0.8 | 0.56 | 22 | 12.8 | 43 | 59 | 30 | 18 | 4 | 14 | 17 |
| 2 | 1.5* | 0.8 | 0.56 | 50 | 12.7 | 103 | 140 | 70 | 17 | 9 | 8 | — |
| 3 | 1.5* | 0.8 | 0.56 | 95 | 12.5 | 27 | 41 | 20 | 4 | 3 | 1 (two phases) | — |
| 4 | 1.5 | 0.8 | 0.56 | 22 | 7.9 | 116 | 157 | 78 | 22 | 16 | 6 | — |
| 5 | 1.5 | 0.8 | 0.56 | 22 | 6.2 | 108 | 148 | 74 | 18 | 15 | 3 | — |
| 6 | 1.5 | 0.8 | 0.56 | 22 | 3.0 | 45 | 65 | 32 | 4 | 4 | 0 | — |
| 6 | 1.5 (after addition of NaOH) | 0.8 | 0.56 | 22 | 12.5 | — | 180 | 90 | 28 | 14 | 14 | — |
| 7 | 2.0 | 0.8 | 0.56 | 22 | 13.0 | 230 | 300 | 150 | 50 | 31 | 19 | 16 |
| 7 | 2.0 (A) | 0.8 | 0.56 | 22 | 13.0 | 82 | 107 | 53 | 58 | 15 | 43 | 17 |
| 8 | 2.0* | 0.8 | 0.56 | 50 | 13.0 | 205 | 290 | 145 | 43 | 27 | 16 | — |
| 9 | 2.0* | 0.8 | 0.56 | 95 | 13.0 | 56 | 82 | 41 | 15 | 9 | 6 | — |
| 10 | 2.0 | 0.8 | 0.56 | 22 | 8.0 | 80 | 106 | 53 | 33 | 11 | 12 | — |
| 11** | 1.25 | 0.8 | 0.56 | 22 | 12.9 | — | 92 | 46 | 13 | 7 | 6 | — |
| 12*** | 2.0 | 0.8 | 0.56 | 22 | 13.0 | 240 | 300 | 150 | 53 | 41 | 12 | — |
| 12 | 2.0 (A) | 0.8 | 0.56 | 22 | 13.0 | 109 | 130 | 75 | 45 | 20 | 25 | — |

*After aging for 24 hours
**Started with a 2.0 lbs/bbl thixotropic solution which was then diluted with water to an AV of 46 cps (100 grams solution + 60 grams H$_2$O).
***Fresh water plus 5% KCl
AV Apparent viscosity
(A) Solution subjected to 5 minutes shear at 100,000 sec$^{-1}$
'minutes
"second

TABLE 3

PROPERTIES OF QP-100MH/FERRIC CHLORIDE SEA WATER AND SEA WATER PLUS KCl SOLUTIONS

| Compound | QP-100MH Concentration lbs/bbl | FeCl$_3$.6H$_2$O 50% Concent. % (on total solution) | NaOH % (on total solution) | T °C. | pH | Fann Viscosity (cps) 300 | 600 | AV | Gel Strength (lbs/100 ft$^2$) 10' | 10" | 10'–10" | API Water Loss (ml/ 30 mins.) |
|---|---|---|---|---|---|---|---|---|---|---|---|---|
| 13 | 1.5 |  | 0.56 | 22 | 12.8 | 57 | 82 | 41 | 15 | 6 | 9 | 14 |
| 13 | 1.5 (A) | 0.8 | 0.56 | 22 | 12.8 | 34 | 49 | 24 | 4 | 3 | 1 | 29 |
| 14 | 2.0 |  | 0.56 | 22 | 13.0 | 74 | 110 | 55 | 16 | 10 | 6 | 14 |
| 14 | 2.0 (A) | 0.8 | 0.56 | 22 | 13.0 | 58 | 80 | 40 | 9 | 6 | 3 | 18 |
| 15 | 2.5 | 0.8 | 0.56 | 22 | — | 130 | 180 | 90 | 30 | 19 | 11 | — |
| 15 | 2.5 (A) | 0.8 | 0.56 | 22 | — | 95 | 120 | 60 | 17 | 12 | 5 | — |
| 16* | 1.5 | 0.8 | 0.56 | 22 | 12.7 | 55 | 80 | 40 | 16 | 5 | 11 | — |
| 16* | 1.5 (A) | 0.8 | 0.56 | 22 | 12.7 | 35 | 50 | 25 | 4 | 3 | 1 | — |
| 17* | 2.0 | 0.8 | 0.56 | — | — | 72 | 105 | 52 | 14 | 8 | 6 | — |
| 17* | 2.0 (A) | 0.8 | 0.56 | — | — | 55 | 76 | 38 | 7 | 5 | 2 | — |
| 18* | 2.5 | 0.8 | 0.56 | — | — | 120 | 170 | 85 | 27 | 17 | 10 | — |
| 18* | 2.5 (A) | 0.8 | 0.56 | — | — | 94 | 120 | 60 | 17 | 12 | 5 | — |

*Sea water plus 5% KCl
(A) Solution subjected to 5 minutes shear at 100,000 sec$^{-1}$
AV Apparent viscosity
' minutes
" seconds

I claim:

1. A process for producing a non-hydraulic thixotropic aqueous liquid which comprises mixing together an aqueous solution of a hydrated cellulose ether and at least 0.05% and not more than 0.4% by weight based on the weight of the total solution of a water soluble ferric salt with an amount of a water-soluble alkali sufficient to give an alkali solution and to make said liquid thixotropic in the absence of a hydraulic substance.

2. A process according to claim 1 wherein the cellulose ether is hydroxy ethyl cellulose.

3. A process according to claim 1 wherein the quantity and molecular weight of the cellulose ether used are sufficient to give an apparent Fann viscosity (600/2) of at least 20 cps in pure aqueous solution.

4. A process according to claim 1 wherein the cellulose ether has a viscosity of at least 70 000 cps at 25° C. at a shear rate of 1 sec$^{-1}$ at 2% by weight concentration in pure water.

5. A process according to claim 1 wherein the cellulose ether is a hydroxy ethyl cellulose with a degree of substitution in the range 0.8 to 1.2.

6. A process according to claim 5 wherein the hydroxy ethyl cellulose has a molar substitution in the range 1.7 to 2.3.

7. A process according to claim 1 wherein the ferric salt is ferric chloride.

8. A process according to claim 1 wherein the alkali is sodium hydroxide.

9. A process according to claim 1 wherein the quantity of alkali present is equivalent to a quantity of sodium hydroxide in the range 0.5% to 2% by weight of the total solution.

10. A process as defined in claim 1 wherein said cellulose ether is hydroxyethyl cellulose or carboxyethyl cellulose.

* * * * *